United States Patent
Karlsson

[11] Patent Number: 6,017,171
[45] Date of Patent: Jan. 25, 2000

[54] MILLING CUTTER BODY AND A METHOD FOR ITS PRODUCTION

[75] Inventor: Rolf Karlsson, Sandviken, Sweden

[73] Assignee: Sandvik Aktiebolag, Sandviken, Sweden

[21] Appl. No.: 08/836,888

[22] PCT Filed: Dec. 13, 1995

[86] PCT No.: PCT/SE95/01503

§ 371 Date: Jun. 3, 1997

§ 102(e) Date: Jun. 3, 1997

[87] PCT Pub. No.: WO96/18473

PCT Pub. Date: Jun. 20, 1996

[30] Foreign Application Priority Data

Dec. 15, 1994 [SE] Sweden ................................ 9404369

[51] Int. Cl.[7] ........................................... B26D 1/12
[52] U.S. Cl. ................... 407/34; 76/115; 407/51
[58] Field of Search ................... 407/34, 40, 48, 407/53, 51, 41; 76/115

[56] References Cited

U.S. PATENT DOCUMENTS

| | | | |
|---|---|---|---|
| 3,213,716 | 10/1965 | Getts | 407/58 |
| 3,535,759 | 10/1970 | Mueller | 29/105 |
| 4,093,392 | 6/1978 | Hopkins | 407/51 |
| 4,919,573 | 4/1990 | Tsujimura et al. | |
| 5,000,625 | 3/1991 | Arai et al. | |
| 5,082,400 | 1/1992 | Shiratori | 407/40 |
| 5,221,162 | 6/1993 | Okawa | |
| 5,597,268 | 1/1997 | Izumi | 407/51 |
| 5,658,100 | 8/1997 | Deiss | 407/48 |

FOREIGN PATENT DOCUMENTS

| | | |
|---|---|---|
| 2634029 | 2/1978 | Germany . |
| 93 05518 | of 1993 | Germany . |
| 2 047 589A | 12/1980 | United Kingdom . |

Primary Examiner—Andrea L. Pitts
Assistant Examiner—Adesh Bhargava
Attorney, Agent, or Firm—Burns, Doane, Swecker & Mathis, L.L.P.

[57] ABSTRACT

The invention relates to a process for the production of a milling tool for cutting machining, preferably of metals. The milling tool includes a holder part (2) for the fixation of the milling tool upon a rotating driving arrangement, and an insert carrying part which around its periphery is equipped with several detachable cutting inserts (23), each cutting insert being fastened in an insert seat, which at least partly is situated in a peripheral, insert-carrying milling tool portio (12). Each insert seat includes a bottom support surface (10) and a side support including at least one side support surface (9), a chip pocket (25) being provided in front of each insert seat in the direction of rotation. The side support of the insert seat at least partly is made by a ball-nose end mill (8). This brings about that the number of insert seats in a milling tool may be substantially increased.

5 Claims, 4 Drawing Sheets

MILLING CUTTER BODY AND A METHOD FOR ITS PRODUCTION

BACKGROUND OF THE INVENTION

1. Field of the Invention

The present invention relates to a milling cutter body and a process for the production of this milling cutter body.

2. Description of Related Art

A typical milling cutter tool comprises a holder that can be fixed at the end of a rotating shaft in a predetermined relationship to its rotation axis, and a cutting edge which is carried by the holder at a radial distance from the axis of rotation on the side of the holder that is distal from the shaft, so that the cutting edge describes a circle around the central axis of the shaft when the body is rotated by the shaft. All parts of the holder are located axially and radially behind the cutting edge, so that it may freely come into contact with and machine the surface of a workpiece, which is held in the machine in which the shaft rotates. Since the separate cutting edge is relatively short, it performs a relatively narrow cutting process, wherefore the tool is used with a cross feed or table feed, the direction of feed being parallel to the machined surface of the workpiece, or has an angle to said surface. The cutting edges as such are usually located on detachably fastened cutting inserts, which are usually indexable cutting inserts with one or several cutting edges, or also round inserts.

When milling with face milling cutter bodies, one makes a distinction between a one-tooth cutter, a coarse pitch cutter and a close pitch curter, which have different fields of utilization. The one-tooth cutter, which is mounted in a built-in element, is finely adjustable, i.e., the main cutting insert, which is convexly shaped, can be adjusted in relation with the working plane, it being possible also to compensate for the inclination of the spindle by this fine adjustment.

Coarse pitch cutters are provided with cassettes which accomodate round or square indexable cutting inserts. They are usually utilized for so called rough milling whereby the attained surface quality depends on the feed per tooth of the utilized indexable cutting insert and the axial planar feed of the miller. Normally, $R_a$-values between 3.2 and 12.5 μm are obtained.

Close pitch cutters are primarily used in the motor industry. They are suited for the milling of cylinder blocks and similar parts.

When milling profiles, full-width grooves, continuous ramping with helical interpolation and pockets by ramping, then cutting inserts with round edges are suitably used. Similar to other cutting edges, each one of the rounded inserts can be fastened by a locking screw, which is threaded through a central through-hole in the cutting insert and is tightened into a threaded hole in the milling cutter body. Such a milling tool is disclosed in DE-U-93 05518.8.

In order to make possible a high table feed, and thereby a high productivity, it is necessary to have stable machines and motors with a high output. If these two basic conditions are fulfilled, then naturally a close pitch cutter gives a higher table feed than a coarse pitch cutter, if the tooth feed is of the same order of magnitude in the two cases. Moreover, it is a well-known fact for the skilled man that at a given table feed, a close pitch cutter gives a smoother surface than a coarse pitch cutter.

OBJECTS OF THE PRESENT INVENTION

Thus, a primary object of the present invention is to increase the number of insert seats in a milling cutter body for each given diameter, in comparison with hitherto known milling cutter bodies.

Another object of the present invention is to provide a process for the production of an insert seat in a milling cutter body in the most simple and efficient possible way, with a minimum of tools.

BRIEF DESCRIPTION OF THE DRAWINGS

For illustrative but non-limiting purposes, a preferred embodiment of the invention will now be described with reference to the appended drawings. These are herewith briefly presented.

DETAILED DESCRIPTION OF THE PREFERRED EMBODIMENTS

Figure 1:
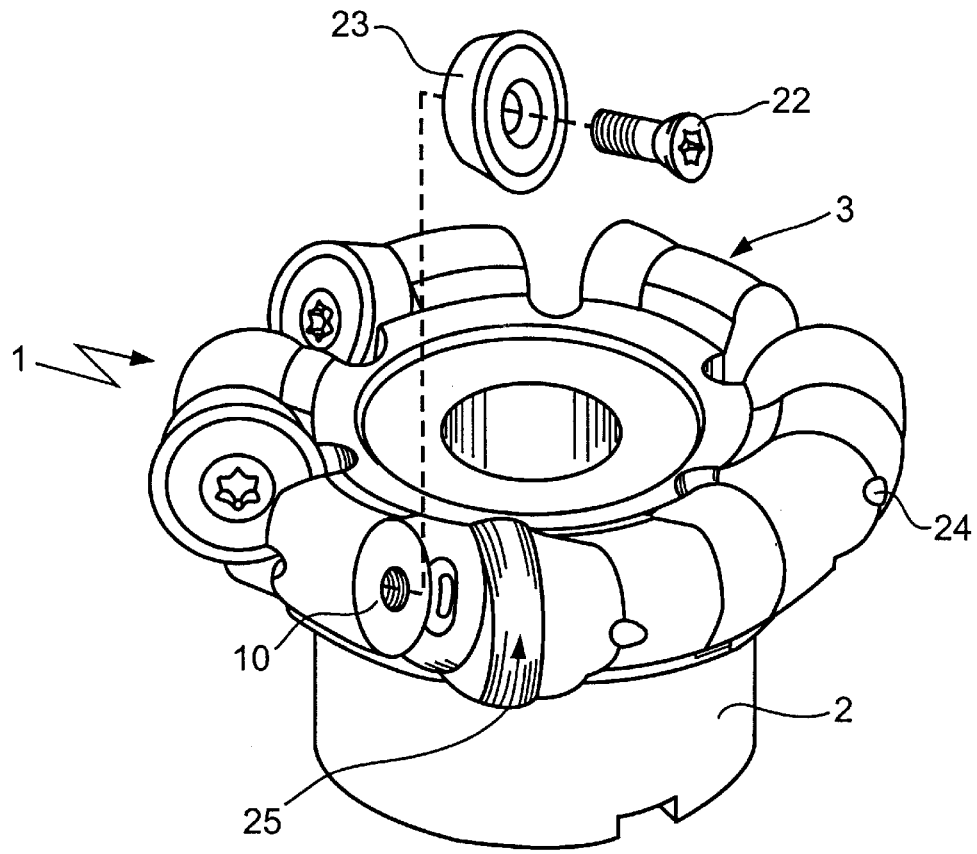
FIG. 1 shows a milling cutter according to the invention with round cutting inserts in a perspective view, obliquely from above.
Figure 2:
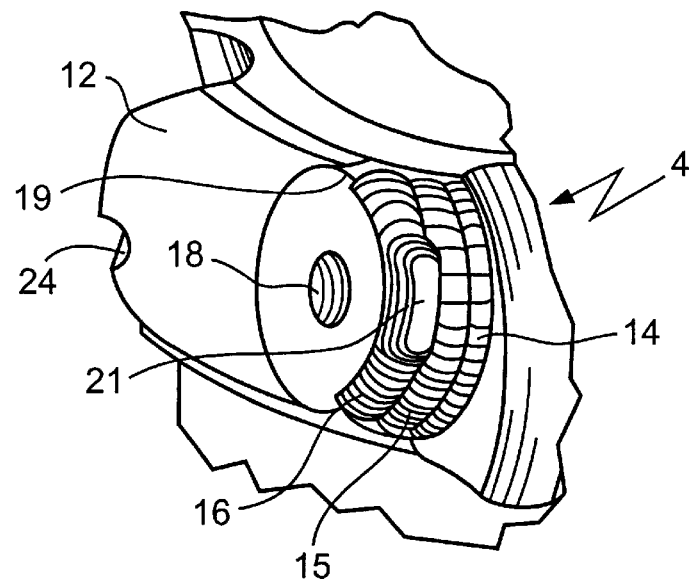
FIG. 2 shows an enlargement of an insert seat of the round insert miller according to FIG. 1.

FIG. 1 shows a round insert milling tool according to the invention, which is generally designated by 1. Its end that is distal from the cutting inserts consists of a fastening part 2 of conventional construction, which is fastened upon a rotating driving shaft. The cutting end of the tool comprises a normally turned bulge 3, which is cut by a plurality of milled insert pockets 4 with appurtenant chip pockets 25. Thanks to the process according to the present invention, the milling tool comprises six insert seats, but if so desired, it may also comprise seven or even eight. At a milling diameter of about 70 mm, the corresponding number for a milling tool, whose insert seats have been manufactured by conventional technique, would be maximally five. The reason for this may be most clearly seen in FIG. 5. In this figure it is shown how the manufacturing of an insert seat is realized, on one hand by conventional technique (holder 5 and end mill 6) and on the other hand by the process according to the invention (holder 7 and end mill 8). Primarily for the production of an insert seat for a round cutting insert or a triangular insert, or for cutting inserts in general which have an acute corner angle, it is necessary due to sterical reasons to make the side support surfaces 9 of the insert seat by means of an end mill straight from above, i.e., perpendicularly to the bottom surface 10 of the insert seat. In order to give the side support surface 9 a certain inclination in order to bear against an insert with clearance, usually an end mill is used with a conical top 11. In order to make place for such a milling tool, material corresponding to the hatched section 5 must be removed from the cutter body. As an example may be mentioned that a milling diameter $D_1$ of 250 mm requires a free overhang $L_1$ of 93 mm and a milling diameter $D_2$ of 500 mm a free overhang $L_2$ of 126 mm. Hence, it is easily conceived that the necessity of accessability for the manufacturing of an insert seat according to known technique strongly restricts the possibilities to manufacture close pitch tools, and that this restriction is accentuated for increasing milling diameters. Furthermore, by a further study of FIG. 5 also other disadvantages can be detected, namely: a) At a long free overhang, the tendencies to vibrations increase, whereby so called vibration marks are caused in the manufactured side support surface and the exact positioning of the insert becomes less reliable, and b) continual changes of tools are required when manufacturing milling cutter bodies of different diameter.

Figure 4:
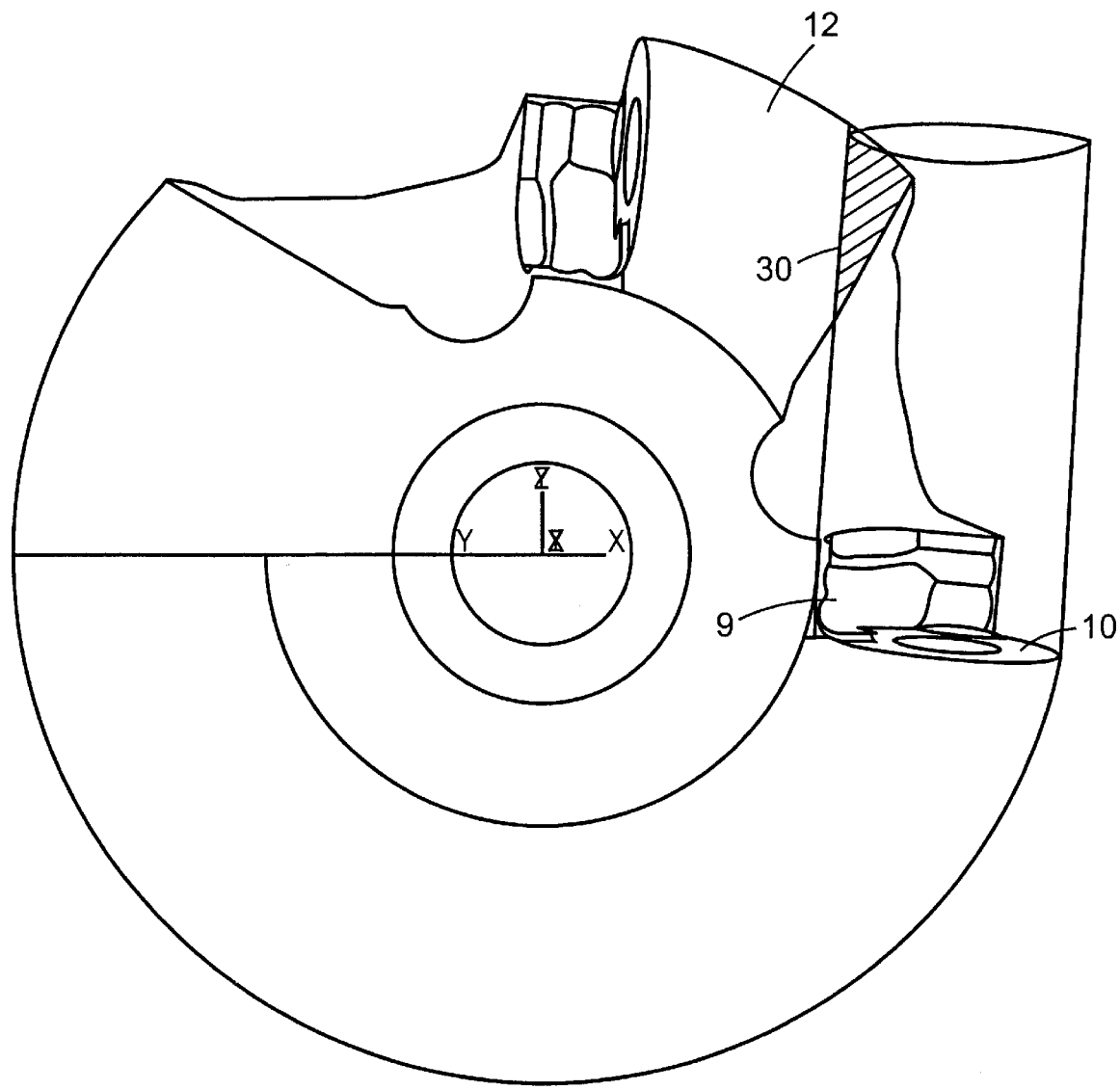
FIG. 4 shows a projection of insert seat.
Figure 5:
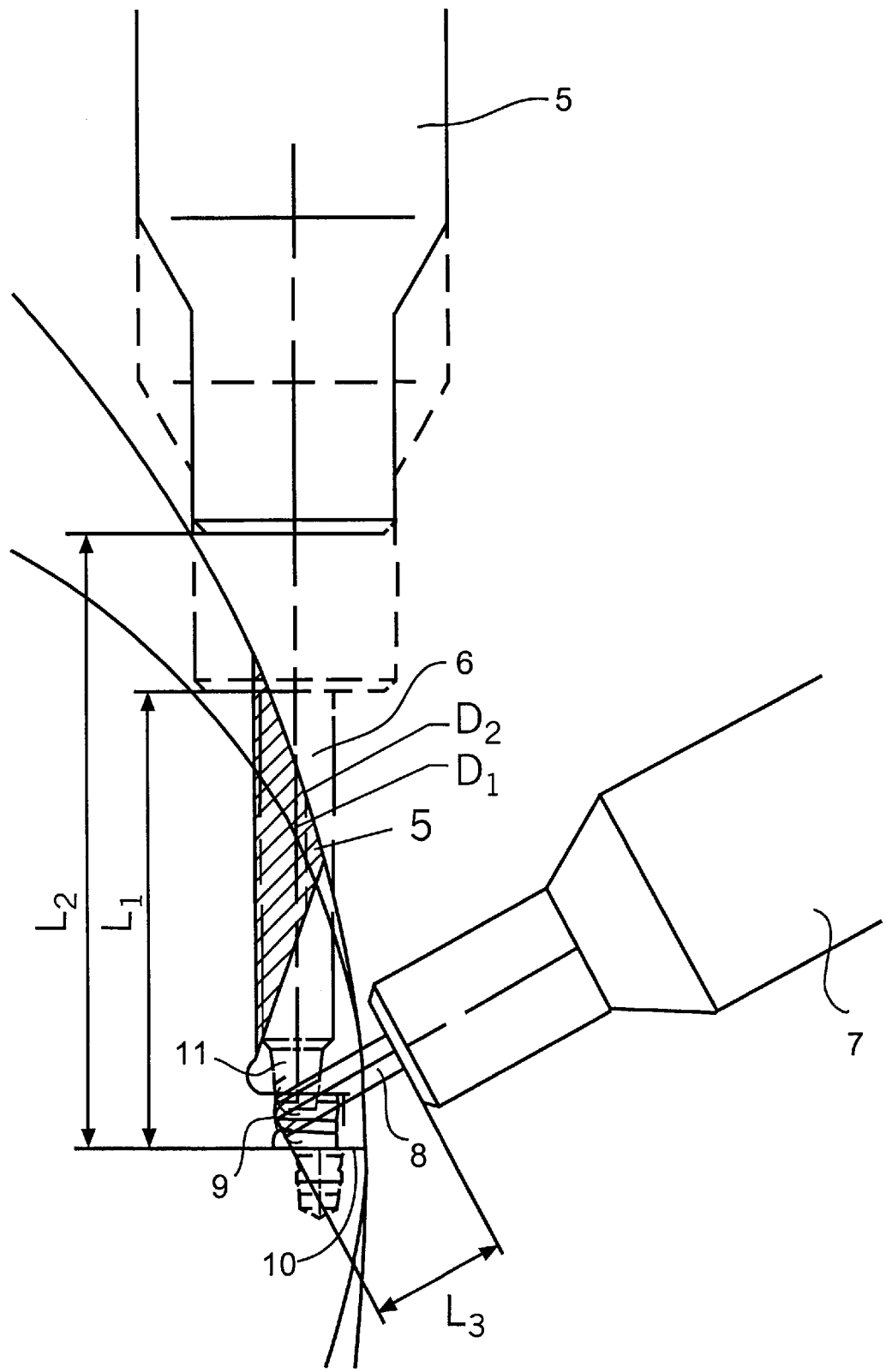
FIG. 5 illustrates the production of an insert seat, both by conventional technique and by a process according to the invention.

According to the invention, all these inconveniences have been overcome in a surprisingly simple and smooth way by producing the side supports of the insert seat in the form of one or several side support surfaces 9 with a ball-nose end mill 8, according to FIG. 5. The free overhang $L_3$ of said end mill is restricted to about 27 mm, independently of milling diameter, whereby vibrations are minimized or even wholly eliminated and tool changes are avoided. Since the machining is performed more in a radial direction, the accessability of concealed parts is improved by the fact that they are located tangentially behind the leading, protruding insert-carrying part or support bulge 12 of the cutter body, in the direction of rotation. In FIG. 4, a projection 30 or imaginary line extending perpendiculary from the bottom support surface 10 is illustrated intersecting the periphery of the body portion 12. Thus, in accordance with DE-U-93 05518.8, one has only succeeded in producing insert seats with two interperpendicular side support surfaces (or with an obtuse angle between them) "in the shadow" of the leading protruding part 12, an end mill with a straight front end being utilized. Of this reason, the flank surfaces of the round cutting inserts in this document have planar abutment chamfers, which however necessitate a tedious and costly grinding of every round insert.

Figure 3:
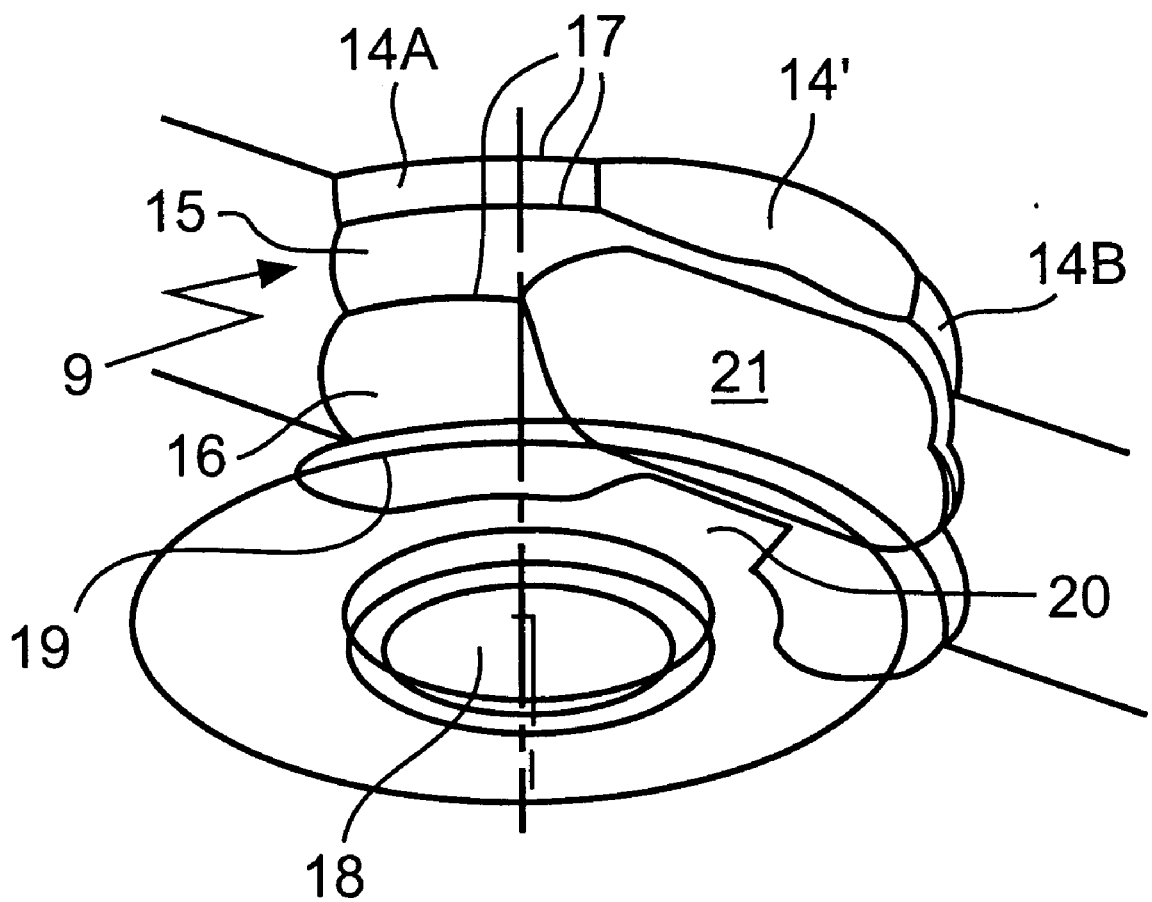
FIG. 3 shows a somewhat modified embodiment of the insert seat, in a perspective view.

As mentioned, a ball-nose end mill 8 is used according to the invention, whose diameter suitably lies between 2 and 12 mm. Thereby, a number of grooves 14, 15, 16 arise on the side support surface 9, with substantially circle-segment-shaped cross-sections, such a groove being brought about at each stroke of the end mill. The smallest number of grooves is two. Ridges 17 are created between the grooves and along the upper border line of the support surface 9, respectively. At least one but suitably two of these ridges 17 function as abutments for the cutting insert. Suitably, the screw hole 18 is positioned somewhat staggered towards the inner of the insert seat, whereby a certain preload of the cutting insert against said abutment ridges is attained. Preferably, the two upper, seen in the direction away from the bottom support surface 10, ridges 17 function as abutment ridges. In order to create two distinct, statically well-defined abutment areas, the upper groove may be divided into two end portions 14A and 34B, respectively, in accordance with FIG. 3, a deeper portion 14' being situated between these two end portions, which portion 14' constitutes a free surface. The deep portion 14' is suitably accomplished by the same ball-nose end mill as the portions 14A abd 14B by simply milling somewhat deeper axially.

The lowermost groove 16 is suitably juxtaposed upon the inner border line 19 of the bottom support surface 10. On one hand, this makes possible a machining allowance when making the bottom support surface 10, which is for instance produced by milling, and on the other hand a pinching of possible small particles and impurities at the bottom, behind the cutting insert, is avoided. Moreover, the groove 16 also serves as a reinforcement, since a radius has a considerably lower stress concentration than a sharp corner, which improves the cracking resistance. However, in order to make possible a stable support upon the bottom support surface 10, the latter is suitably extended by a tongue portion 20 into the insert seat. In order to shape this portion 20, one suitably allows the ball-nose end mill 8 to scan somewhat deeper at the middle portion of the support surface 9, whereby a depression 21 is created, which does not have any practical function as such. Further, it should be pointed out that the grooves 15 and 16 and the ridge 17 located between these grooves, constitute free surfaces, without any contact with the cutting insert.

In order to make possible the access to the locking screw 22 by means of a suitable key, for fastening or loosing a cutting insert 23, a recess 24 is provided at the rear edge of each supporting bulge 12. At a larger number of insert seats, but with otherwise maintained dimensions, this recess 24 is made correspondingly deeper.

By milling out an insert seat according to the present invention, a number of advantages have been achieved. Thus, on a trailing insert seat edge support surfaces 9 of an arbitrary shape have been made, which are located radially within the projection of the leading insert-carrying cutter body portion 12, which projection is perpendicular to the bottom support surface 10 of the trailing insert seat. Hitherto, this has only been possible for square or rectangular cutting inserts, whose two side support surfaces are perpendicular to each other (see for instance DE-U-93 05518.8) and which can then be made by an end mill whose end surface is straight and perpendicular to the extension of the end mill. By the present invention, for instance also round, triangular, rhombic, rhomboidic and hexagonal insert seats may be produced, with a tooth pitch whose only real limitation is the obtainment of sufficient strength in each protruding insert-carrying portion 12. Thus, substantially straight side support surfaces can be produced, which have an internal enclosed angle of less than 90°, e.g. 80 or 70°. Furthermore, the bottom support surfaces 10 may be angled within wide ranges in order to give the insert the desired functional inclination in the holder. Moreover, the possibility is given of turning and tipping the ball-nose end mill while its function is maintained, whereby also the so called C- and B-turning in the machine is reduced. Moreover, maximally two different ball-nose end mills are required when producing an insert seat, independently of the milling diameter.

I claim:

1. A milling cutter body for cutting machining, comprising:

a holder part for fixation of the cutter body upon a rotating driver, and a cutting insert-carrying portion which around its periphery is equipped with several insert seats and detachably fastened cutting inserts, each cutting insert being fastened in a respective one of the insert seats, which at least partly are located in the periphery of the insert-carrying cutter body portion and which is integral with the milling cutter body, each insert seat comprising a bottom support surface and a side support comprising at least one side support surface, and a chip pocket provided in front of each insert seat in a direction of rotation, the side support comprises a side support surface which is intended to function as an abutment for a cutting insert, wherein an imaginary line extending perpendicularly from a portion of each bottom support surface of the insert seats intersects a portion of the cutting insert carrying portion.

2. The milling cutter body according to claim 1, wherein each side support surface is round in order to function as an abutment for a round cutting insert.

3. The milling cutter body according to claim 1, wherein each side support surface comprises three milled-out grooves with circle-segment-shaped cross-sections, ridges being created between the grooves and along an upper border line of the side support surface, and one or two of these ridges functioning as abutments for the cutting inserts.

4. The milling cutter body according to claim 3, wherein an uppermost of one of the grooves is shaped with a depressed middle portion in order to create two statically well defined end support portions for the cutting insert.

5. A process for the production of a milling cutter tool for cutting machining, comprising a holder part for fixation of the milling cutter tool upon a rotating driving arrangement, and a cutting insert-carrying part which around its periphery is equipped with several detachably fastened cutting inserts, each cutting insert being fastened in an insert seat, which at least partly is situated in a pheripheral, insert-carrying tool portion, each insert seat comprising a bottom support surface and a side support comprising at least one side support surface, a chip pocket provided in front of each insert seat in a direction of rotation, comprising the steps of producing the side support of the insert seat at least partly by a ball-nose end mill and producing the side support of a trailing insert seat radially within a projection of a leading portion of the insert-carrying tool portion, which projection is perpendicular to the bottom support surface of the trailing insert seat.

* * * * *